United States Patent [19]
Jacobson et al.

[11] Patent Number: 5,237,641
[45] Date of Patent: Aug. 17, 1993

[54] TAPERED MULTILAYER LUMINAIRE DEVICES

[75] Inventors: Benjamin A. Jacobson; Roland Winston, both of Chicago, Ill.

[73] Assignee: NiOptics Corporation, Evanston, Ill.

[21] Appl. No.: 855,838

[22] Filed: Mar. 23, 1992

[51] Int. Cl.⁵ .............................................. G02B 6/26
[52] U.S. Cl. .............................. 385/146; 385/43; 385/901
[58] Field of Search ............... 385/146, 147, 43, 140, 385/129, 130, 131, 901

[56] References Cited

U.S. PATENT DOCUMENTS

| | | | |
|---|---|---|---|
| 2,347,665 | 5/1944 | Christensen | 362/31 |
| 2,712,593 | 7/1955 | Merchant | 362/31 |
| 3,617,109 | 11/1971 | Tien | 385/43 X |
| 3,752,974 | 8/1973 | Baker et al. | 240/106 R |
| 3,832,028 | 8/1974 | Kapron | 385/43 |
| 3,980,392 | 9/1976 | Auracher | 385/43 |
| 4,059,916 | 11/1977 | Tachihara et al. | 40/130 |
| 4,111,538 | 9/1978 | Sheridon | 350/96.10 |
| 4,114,592 | 9/1978 | Winston et al. | 126/270 |
| 4,161,015 | 7/1979 | Dey et al. | 362/263 |
| 4,212,048 | 7/1980 | Castleberry | 362/19 |
| 4,240,692 | 12/1980 | Winston | 350/96.10 |
| 4,257,084 | 3/1981 | Reynolds | 362/31 |
| 4,373,282 | 2/1983 | Wragg | 40/546 |
| 4,420,796 | 12/1983 | Mori | 362/32 |
| 4,453,200 | 6/1984 | Trcka et al. | 362/31 |
| 4,528,617 | 7/1985 | Blackington | 362/32 |
| 4,547,043 | 10/1985 | Penz | 350/335 |
| 4,573,766 | 3/1986 | Bournay et al. | 350/345 |
| 4,618,216 | 10/1986 | Suzawa | 350/345 |
| 4,649,462 | 3/1987 | Debrowolski et al. | 362/2 |
| 4,706,173 | 11/1987 | Hamada et al. | 362/341 |
| 4,735,495 | 4/1988 | Henkes | 350/345 |
| 4,737,896 | 4/1988 | Mochizuki et al. | 362/301 |
| 4,747,223 | 5/1988 | Borda | 40/219 |
| 4,765,718 | 8/1988 | Henkes | 350/345 |
| 4,799,137 | 1/1989 | Aho | 362/339 |
| 4,832,458 | 5/1989 | Fergason et al. | 350/338 |
| 4,907,044 | 3/1990 | Schellhorn et al. | 357/17 |
| 4,907,132 | 3/1990 | Parker | 362/32 |
| 4,914,553 | 4/1990 | Hamada et al. | 362/32 |
| 4,915,479 | 4/1990 | Clarke | 350/345 |
| 4,936,529 | 6/1990 | Anderson et al. | 350/339 |
| 4,950,059 | 8/1990 | Roberts | 350/34.5 |
| 4,974,122 | 11/1990 | Shaw | 362/31 |
| 4,974,353 | 12/1990 | Norfolk | 40/447 |
| 4,998,188 | 3/1991 | Degelmann | 362/332 |
| 5,019,808 | 5/1991 | Prince et al. | 340/765 |
| 5,044,734 | 9/1991 | Sperl et al. | 359/49 |
| 5,046,805 | 9/1991 | Simon | 385/31 |
| 5,046,829 | 9/1991 | Worp | 359/49 |
| 5,050,946 | 9/1991 | Hathaway et al. | 385/33 |
| 5,101,325 | 3/1992 | Davenport et al. | 362/31 |

OTHER PUBLICATIONS

Ning, X., et al., "Dielectric Totally Internally Reflecting Concentrators," Applied Optics, vol. 26, No. 2, Jan. 15, 1987.

Ning, X., et al., "Optics of Two-Stage Photovoltaic Concentrators With Dielectric Second States," Applied Optics, vol. 26, No. 7, Apr. 1, 1987.

Hathaway, K. J. et al. "New Backlighting Technologies For LCSs", Soc. for Information Display International Symposium, vol. XXII, May 6-10, 1991.

Blumenfeld, A. M. and Jones, S. E., "Parts That Glow," Machine Design, Jul., 1985.

*Primary Examiner*—John D. Lee
*Assistant Examiner*—Phan J. Heartney
*Attorney, Agent, or Firm*—Reinhart, Boerner, Van Deuren, Norris & Rieselbach

[57] ABSTRACT

An optical device for collecting light and selectively outputting or concentrating the light. A layer has an optical index of refraction $n_1$, and top, bottom and side surfaces intersecting to define an angle of inclination $\phi$. A back surface spans the top, bottom and side surface. A first layer is coupled to the bottom surface of the layer and has an index of refraction $n_2$. The first layer index $n_2$ causes light input through the back surface of the layer to be preferentially output into the first layer. A second layer is coupled to the bottom of the first layer and selectively causes output of light into ambient. The layer can also have a variable index of refraction $n$ (x, y, z).

48 Claims, 7 Drawing Sheets

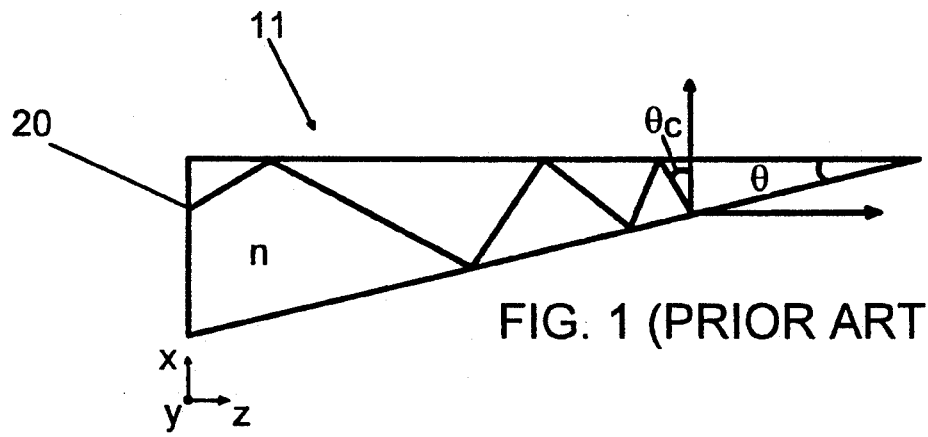
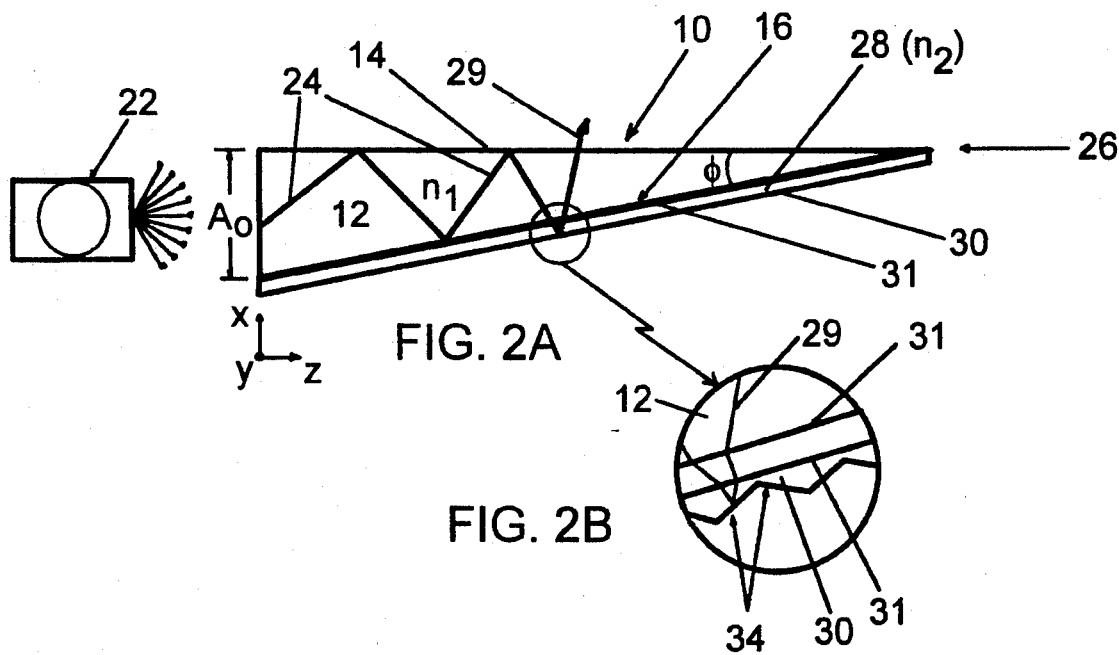

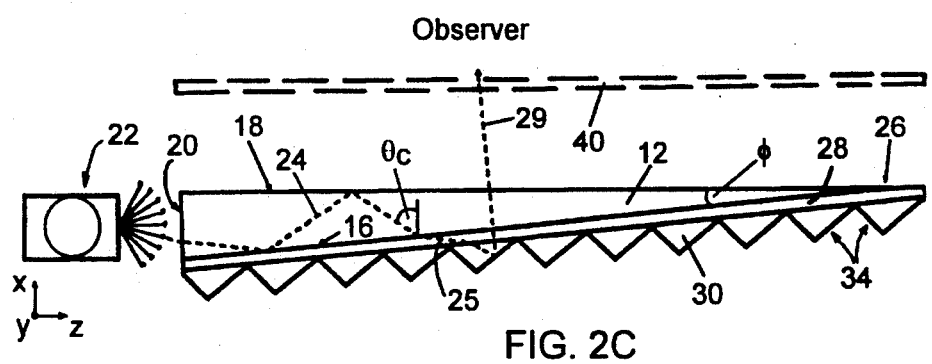
FIG. 2C
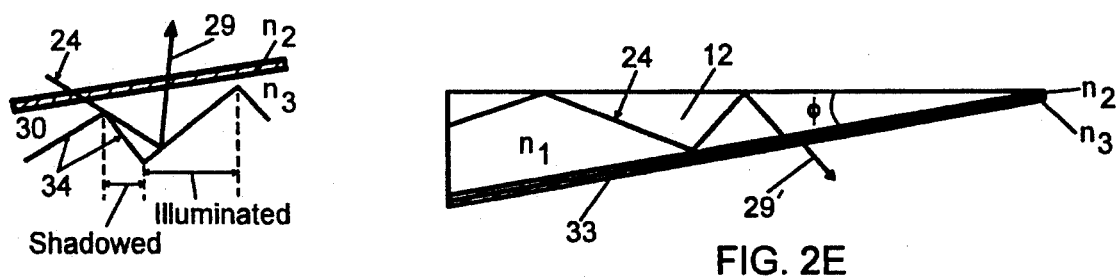
FIG. 2D
FIG. 2E

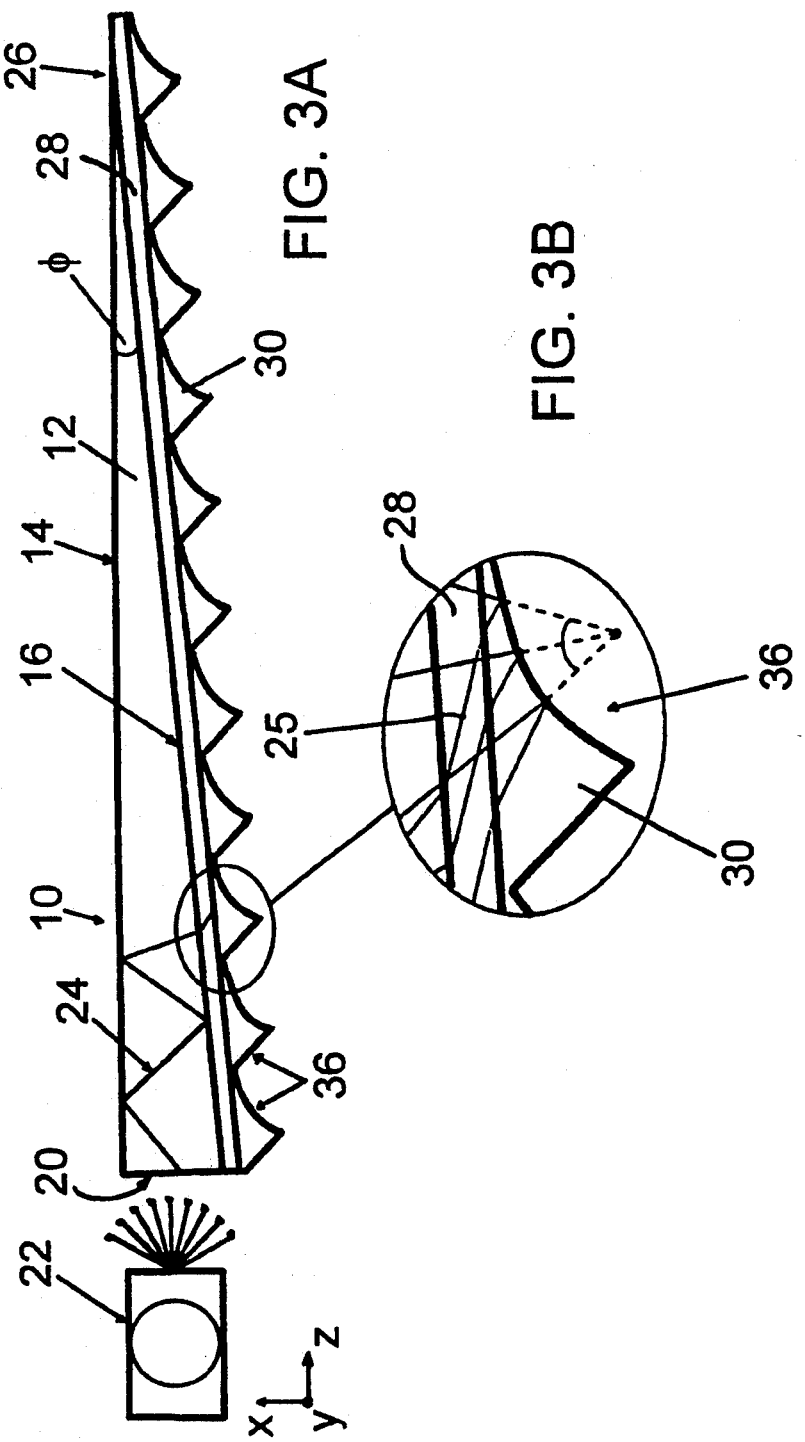

TAPERED MULTILAYER LUMINAIRE DEVICES

The present invention is concerned generally with a luminaire device for providing selected illumination. More particularly the invention is concerned with tapered luminaires, such as a wedge or disc shape, for backlighting and control of illumination and light concentration generally.

A variety of applications exist for luminaire devices, such as, for liquid crystal displays. For flat panel liquid crystal displays, it is important to provide adequate backlighting while maintaining a compact lighting source. It is known to use wedge shaped optical devices for general illumination purposes. Light is input to such devices at the larger end; and light is then internally reflected off the wedge surfaces until the critical angle of the reflecting interface is reached, after which light is output from the wedge device. Such devices, however, tend to deliver an uncollimated lighting output and are often inefficient sources of illumination because light is emitted from both sides.

It is therefore an object of the invention to provide an improved luminaire and method of manufacture.

It is another object of the invention to provide a novel three dimensional luminaire.

It is a further object of the invention to provide on improved multilayer tapered device for luminaire purposes such as backlighting.

It is still another object of the invention to provide a novel wedge device for selective control and concentration of light.

It is an additional object of the invention to provide a novel luminaire providing collimated illumination from a surface at selected angles of collimation.

It is yet a further object of the invention to provide an improved lightguide.

It is still another object of the invention to provide a novel luminaire allowing controlled angular output of illumination or controlled angular input for concentration.

It is yet a further object of the invention to provide an improved illumination system wherein a fluorescent tubular light source is coupled to a multilayer optical wedge for generating a collimated output from a rectangular surface area.

It is still a further object of the invention to provide a novel luminaire device having a variable index of refraction over the spatial parameters of a luminaire.

It is yet an additional object of the invention to provide an improved luminaire wedge device having nonlinear taper along selected spatial parameters.

Other objects, features and advantages of the present invention will be readily apparent from the following description of the preferred embodiments thereof, taken in conjunction with the accompanying drawings described below, wherein like elements have like numerals throughout the several views.

BRIEF DESCRIPTION OF THE DRAWINGS

FIG. 1 shows a prior art wedge shaped light pipe;

FIG. 2A illustrates a multilayer wedge device constructed in accordance with the invention; FIG. 2B is a magnified partial view of the junction of the wedge layer, the first layer and the second faceted layer; FIG. 2C is an exaggerated form of FIG. 2A showing a greatly enlarged second faceted layer; FIG. 2D is a partial view of the junction of the three layers illustrating the geometry for brightness determinations; FIG. 2E is a multilayer wedge device with a substantially smooth layer on the bottom.

FIG. 3A illustrates a multilayer wedge device with curved facets on the ambient side of the second layer and FIG. 3B shows a magnified partial view of the junction of the various layers of the device;

DETAILED DESCRIPTION OF PREFERRED EMBODIMENTS

Figure 4A:
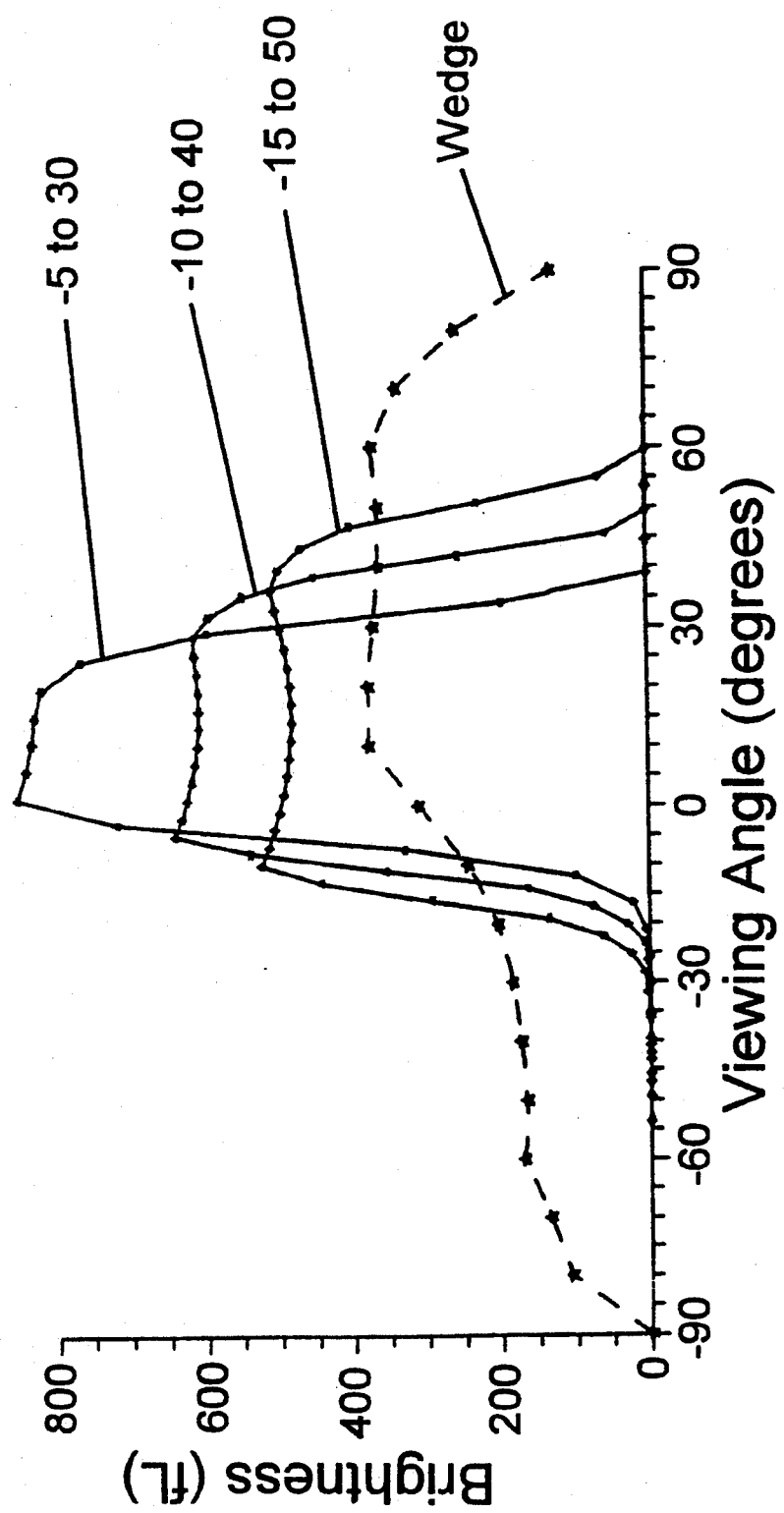
FIG. 4A shows calculated brightness performance over angle for an asymmetric range of angles of illumi7 nation.

A multilayer luminaire device constructed in accordance with a preferred form of the invention is illustrated in FIG. 2 and indicated generally at 10. A prior art wedge 11 is shown generally in FIG. 1. In this wedge 11 the light rays within the wedge 11 reflect from the surfaces until the angle of incidence is less than the critical angle ($\sin^{-1} 1/n$) where n is the index of refraction of the wedge 11. The light can exit equally from both top and bottom surfaces of the wedge 11, as well as exiting at grazing angles.

The multilayer luminaire device 10 (hereinafter "device 10") shown in FIG. 2A includes a wedge layer 12 which has a characteristic optical index of refraction of $n_1$. The x, y and z axes are indicated adjacent FIGS. 2A and 2C with "y" perpendicular to the paper. Typical useful materials for the wedge layer 12 include almost any transparent material, such as glass, polymethyl methacrylate, polystyrene, polycarbonate, polyvinyl chloride, methyl methacrylate/styrene copolymer (NAS) and styrene/acrylonitrile. The wedge layer 12 further includes a top surface 14, a bottom surface 16, side surfaces 18 and a back surface 20 of thickness $A_o$ spanning the top, bottom and side surfaces. A light source, such as a tubular fluorescent light 22, injects light 24 through the back surface 20 into the wedge layer 12. The light 24 is internally reflected from the various wedge layer surfaces and is directed along the wedge layer 12 toward edge 26. For the case where the surfaces 14 and 16 are flat, an angle of inclination $\phi$ for a linear wedge is defined by the top surface 14 and the bottom surface 16. In cc the case of nonlinear wedges, a continuum of angles $\phi$ are definable, and the nonlinear wedge can be designed to provide the desired control of light output or concentration. Such a nonlinear wedge will be described in more detail later.

Coupled to the wedge layer 12 without any intervening air gap is a first layer 28 having an optical index of refraction of $n_2$ and optically coupled to the bottom surface 16. The layer 28 can range in thickness from a few wavelengths to greater thicknesses and accomplish the desired functionality. The resulting dielectric interface between the wedge layer 12 and the first layer 28 has a higher critical angle than at the interface between the wedge layer 12 and ambient. As will be apparent hereinafter, this feature allows preferential angular output of the light 24 from the device 10.

Coupled to the first layer 28 is a second layer 30 having an optical index of refraction $n_3$ which is greater than $n_2$, and preferably greater than $n_1$, which allows the light 24 to leave the first layer 28 and enter the second layer 30 (best seen in FIG. 2B). In a most preferred embodiment $n_3 > n_1 > n_2$; and there are no intervening air gaps between the first layer 28 and the second layer 30.

In such a multilayer configuration for the device 10 the wedge layer 12 causes the angle of incidence $\theta$ for each cyclic time of reflection from the top surface 14 to decrease by the angle of inclination $2\phi$ (relative to the normal to the plane of the bottom surface 16). When the angle of incidence with the bottom surface 16 is less than the critical angle characteristic of the interface between the wedge layer 12 and the first layer 28, the light 24 is coupled into the first layer 28. Therefore, the first layer 28 and the associated optical interface properties form an angular filter allowing the light 24 to pass when the condition is satisfied: $\theta < \theta_C = \sin^{-1} n_2/n_1$. That is, the described critical angle is higher than for the interface between air and the wedge layer 12. Therefore, if the two critical angles differ by more than $\phi$, the light 24 will cross into the interface between the wedge layer 12 and the first layer 28 before it can exit the wedge layer 12 through the top surface 14. Consequently, if the two critical angles differ by less than $\phi$, some of the light can exit the top surface 14. The device 10 can thus be constructed such that the condition $\phi < \phi_c$ is satisfied first for the bottom surface 16. The escaping light 24 (light which has entered the layer 28) will then enter the second layer 30 as long as $n_3 > n_2$, for example. The light 24 then becomes a collimated light 25 in the second layer 30 provided by virtue of the first layer 28 being adjacent the wedge layer 12 and having the proper relationship between the indices of refraction.

In order to control the angular output of the light 24 from the device 10, the second layer 30 includes means for scattering light, such as a paint layer 33 shown in FIG. 2E or a faceted surface 34 shown in both FIGS. 2B and 2C. The paint layer 33 can comprise, for example, a controllable distribution of particles having characteristic indices of refraction. By appropriate choice, light can be redirected back through the wedge layer 12 into ambient (see light 29 in FIGS. 2A and 2C) or output directly into ambient from the second layer 30 (see light 29' in FIG. 2E). The paint layer 33 can be used to preferentially project an image or other visual information.

In other forms of the invention a further plurality of layers with associated "n" values can exist. In such cases the index of the lowest index layer should be preferably used in designing the desired optical performance. For example, this lowest index of refraction should replace $n_2$ in the equations for numerical aperture and output angle.

The faceted surface 34 optically reflects and redirects light 29 through the second layer 30, the first layer 28 and then through the wedge layer 12 into ambient (see FIGS. 2A and 2C). As shown in FIG. 2B, the period of spacing between each of the faceted surfaces 34 is preferably large enough to avoid diffraction effects, but small enough that the individual facets are not detected by the intended observing means. Some irregularity in the spacing can mitigate undesirable diffraction effects. For typical backlighting displays, a spacing period of 0.001-0.003 inches can accomplish the desired purpose.

The faceted surface 34 can be generally prepared to control the angular range over which the redirected light 29 is output from the device 10. The distribution of output angle in the layer 30 has a width which is approximately equal to:

$$\Delta\theta = 2\phi[(n_1^2 - n_2^2)/(n_3^2 - n_2^2)]^{\frac{1}{2}}$$

Thus, since $\phi$ can be quite small, the device 10 can act effectively as a collimator. Therefore, for the linear faceted surface 34, the exiting redirected light 29 has an angular width in air of approximately:

$$\Delta\theta_{air} = n_3\Delta\theta = 2\phi(n_1^2 - n_2^2)/[1 - (n_2/n_3)^2]^{\frac{1}{2}}.$$

Fresnel reflections from the various interfaces can also broaden the output angle beyond $2\phi$, but this effect can be reduced by applying an antireflection coating 31 on one or more of the internal interfaces as shown in FIG. 2B.

The brightness ratio ("BR") for the illustrated embodiment can be determined by reference to FIG. 2D as well as by etendue match, and BR can be expressed as:

B.R. = illuminated area/total area
B.R. = $[1 - (n_2/n_3)^2]^{\frac{1}{2}} = 0.4 - 0.65$ (for most transparent dielectric materials)

For example, the wedge layer 12 can be acrylic ($n_1 = 1.49$), the first layer 28 can be a fluoropolymer ($n_2 = 1.3-1.34$) or Sol-gel ($n_2 = 1.2-1.3$) and the second layer 30 can be a faceted reflector such as polycarbonate ($n_3 = 1.59$), polystyrene ($n_3 = 1.59$) or acrylic ($n_3 = 1.49$) which have been metallized at the air interface.

The flat, or linear, faceted surfaces 34 shown in FIGS. 2B and 2C redirect the incident light 24 and also substantially preserve the incoming angular distribution. Curved facets 36 shown in FIGS. 3A and B also redirect the incident light 24, but the facet curvature determines the resulting range of angular output for the redirected light 29. For example, a curved trough-shaped mirror can focus collimated light to a line focus. In addition, it is known that a concave trough can produce a real image, and that a convex trough can produce a virtual image (see FIG. 3B). In each case the image is equivalent to a line source emitting light uni7 formly over the desired angular output range. Consequently, an array of such trough shaped facets 36 can redirect the incoming collimated light 25 from the first layer 28, and a plurality of such line source images then form the redirected light 29. By arranging the spacing of the curved facets 36 to less than human eye resolution, the resulting array of line sources will appear very uniform to an observer. As previously mentioned, the choice of 500 lines/inch or 0.002 inches for the period of facet spacing provides such a result.

Figure 4B:
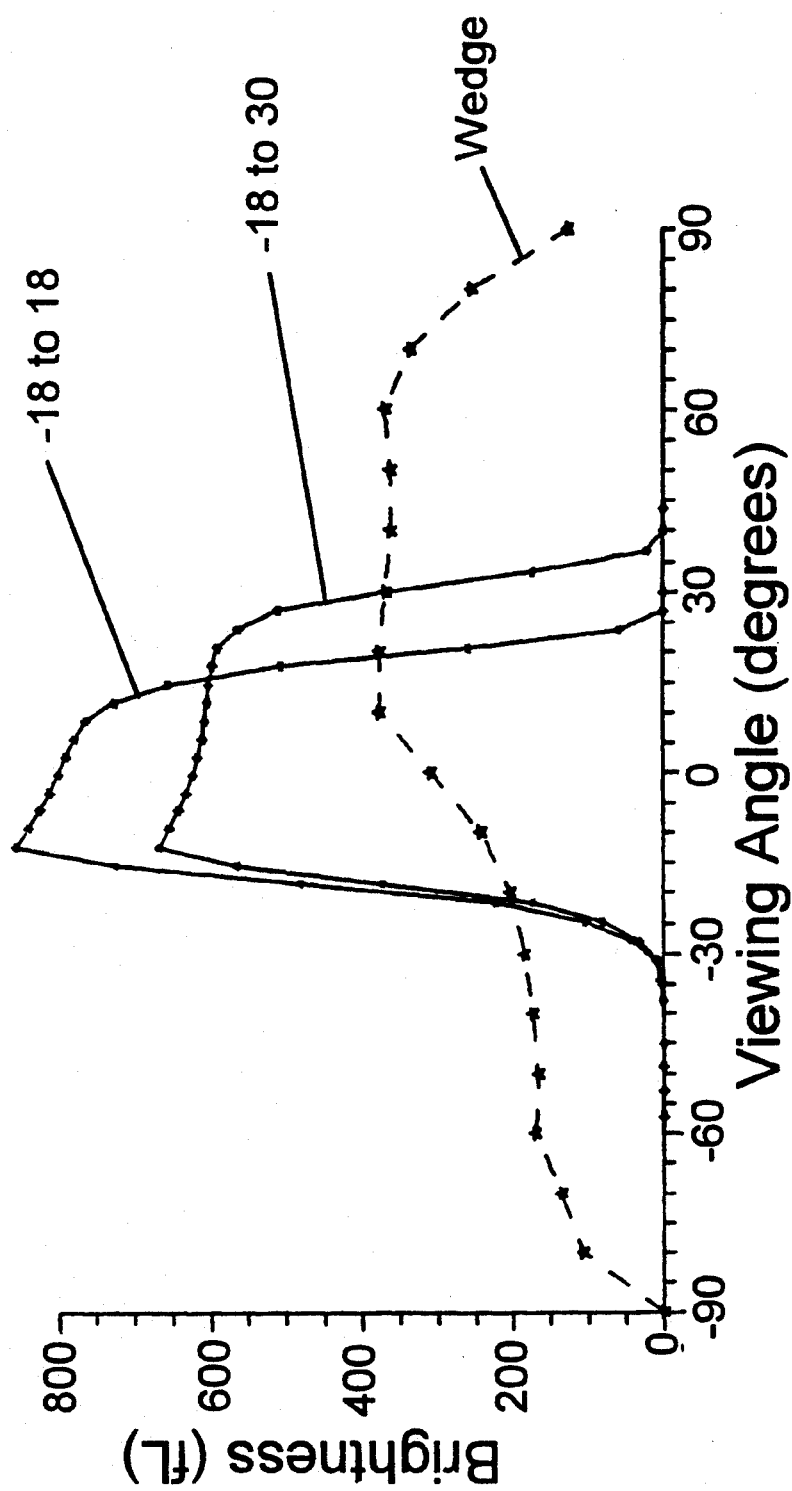
FIG. 4B shows calculated brightness distribution performance over angle for a more symmetric angle range and FIG. 4C illustrates calculated brightness performance over angle for the symmetry of FIG. 4B and adding an external diffuser element.
Figure 4C:
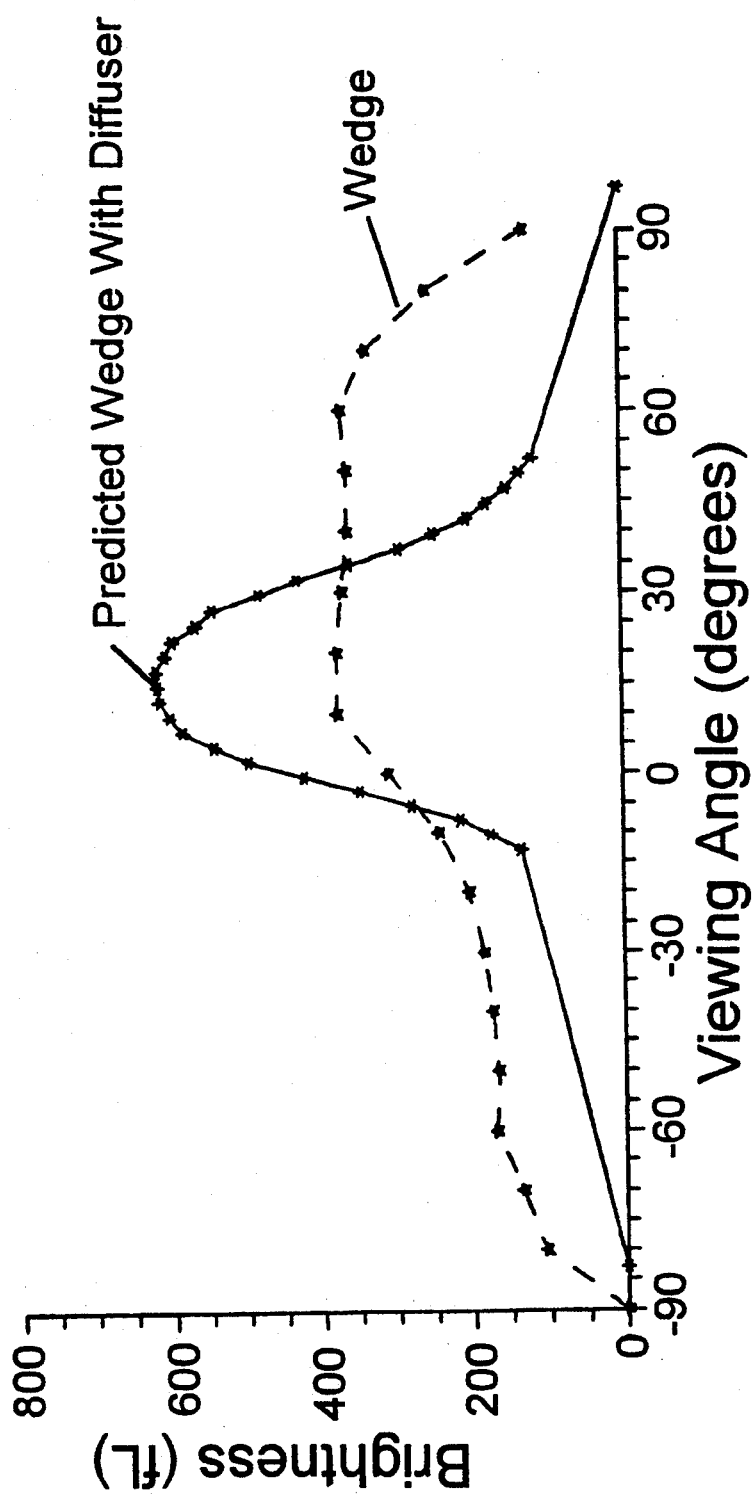

Examples of brightness distribution over various ranges of angular output are illustrated in FIGS. 4A-4C. FIG. 4C shows the brightness distribution in the case of further including a diffuser element 40 (shown in phantom in FIG. 2C). The predicted performance output is shown for the various angular ranges and compared with the measured angular output of light for a commercially available source, such as a Wedge Light unit, a trademark of Display Engineering. The preferred range can readily be modified to accommodate any particular viewing requirements. This modification can be accomplished by changing the curvature of the curved facets 36. In addition to the illustrated control of the vertical viewing angular range, compression and modification of the horizontal viewing range can also be accomplished by appropriate changes of the curvature of the curved facets 36. The above described angular distributions shown in FIGS. 4A-C are properly representative when the device 10 is processing the light 24 within the numerical aperture $NA = (n_1^2 - n_2^2)^{\frac{1}{2}}$. When light is outside this range, it is more difficult to control the angular output range.

Other useful curved facet shapes can include, for example, parabolic, elliptical, hyperbolic, circular and combinations thereof. The user can thus construct virtually arbitrary distributions of averaged brightness of illumination using different facet designs. Whatever the desired facet shapes, the faceted surface 34 is preferably formed by a conventional molding process. The important step in such a known process is micro-machining a master tool. Machining can be carried out by ruling with an appropriately shaped diamond tool. The resulting mold can then be used to emboss the desired shape in the second layer 30. A directly ruled surface can also be used, but the above described embossing method is preferred.

Nonlinear Wedges

In another form of the invention the wedge layer 12, which is the primary lightguide, can be other than the linear shape assumed hereinbefore. These shapes allow achievement of a wide variety of selected light distributions. Other shapes can be more generally described in terms of the thickness of the wedge layer 12 as a function of the wedge axis "z" shown in FIGS. 2B and C (the coordinate axis which runs from the light input edge to the small or sharp edge 26). For the linear shaped wedge, $$A(z) = A_o - C \cdot z \quad (1)$$

$A_o$ = maximum wedge thickness (see FIG. 2A)
$C$ = constant = $\tan \phi$

A large range of desired spatial and angular distributions can be achieved for the light output power (power coupled to the second layer 30). This light output power is thus the light available for output to the ambient by appropriately faceted surfaces 34 or 36, or even by the diffuse reflector 33 or other means.

If L and M are direction cosines along the x and y axes, respectively, then $L_0$ and $M_0$ are the values of L and M at the thick edge (z=0). This initial distribution is Lambertian within some well-defined angular range, with little or no light outside that range. This distribution is especially important because ideal non-imaging optical elements have limited Lambertian output distributions. The key relationship is the adiabatic invariant, $A(z) \cos(\theta_c)$ which is approximately equal to $A_0L_0$ and which implicitly gives the position (z) of escape. To illustrate this concept, suppose we desire uniform irradiance so that $dP/dz$ = constant. Suppose further that the initial phase space uniformly fills an ellipse shown below and described by the following expression:

$$L_o^2/\sigma^2 + M_o^2/\tau^2 = 1$$

wherein $\tau$ is the dimension of ellipse along M axis, and $\sigma$ is the dimension of ellipse along L axis, Then, $dP/dL = \text{const} \cdot [1 - L^2/\sigma^2]^{\frac{1}{2}}$ but $dA/dz = [A_o/L_c]dL_o/dZ$ where $L_c = \cos\theta_c$. Therefore, $[1 - (L_cA)^2/(A_o\sigma)^2]^{\frac{1}{2}} dA$ = constant times dz. Suppose $\sigma = L_c$ in the preferred embodiment. This result can be interpreted by the substitution $A/A_0 = \sin u$, so that $A = A_0 \sin u$ and $u + \frac{1}{2}\sin(2u) = (\pi/2)(1 - z/D)$ where D is the length of the wedge.

If the desired power per unit length is $dP/dz$, more generally, then the desired shape of the wedge layer 12 is determined by the differential equation:

$$dA(z)/dz = - \frac{dP/dz \, (A_o/[1 - (n_2/n_1)^2]^{\frac{1}{2}})}{dP/dL_o} \quad (2)$$

Note that in all these cases the output distribution has only approximately the desired form because it is modified by Fresnel reflections. Note also that even when the wedge device 10 is curved, if the curvature is not too large it may still be useful to define an average angle $\phi$ which qualitatively characterizes the system.

In another aspect of the invention the geometry of the above examples has an x,y interface between two refractive media with indices $n_1$ and $n_2$. The components nM,nN are conserved across the interface so that $n_1M_1 = n_2M_2$, $n_1N_1 = n_2M_2$. The angle of incidence projected in the x,z plane is given by $\sin \theta_{eff} = N/(L^2 - N^2)^{\frac{1}{2}}$. Then using the above relations, $\sin \theta_{2eff}/\sin \theta_{1eff} = (n_1/n_2)[1-M_1^2]^{\frac{1}{2}}/[1-(n_1/n_2)^2M_1^2]^{\frac{1}{2}} = (n_1/n_2)_{eff}$. For example, for $n_1 = 1.49$, $n_2 = 1.35$, $M_1 = 0.5$, the effective index ratio is $1.035(n_1/n_2)$, which is only slightly larger than the actual index.

Variation of Index of Refraction Over Spatial Parameters

In the general case of tapered light guides, the wedge layer 12 is generally along the z axis with the narrow dimension along the x axis (see, for example, FIG. 2A). If we introduce optical direction cosines (nL,nM,nM) where L,M,N are geometric direction cosines along x,y,z, then n is the refractive index which may vary with spatial position. For guided rays in the wedge layer 12, the motion in x is almost periodic, and the quantity $\int nLdx$ for one period is almost constant as the ray propagates along z. This property is called adiabatic invariance and provides a useful framework for analyzing the lightguide properties.

In a first example the wedge device 10 shown in FIG. 2A has a uniform index in the wedge layer 12 and is linearly tapered in z with width $A(z) = A_0 - C \cdot z$. Then, along the zig-zag ray path, $L(z)A(z)$ is approximately equal to a constant by adiabatic invariance. If a ray starts at z=0 with $L = L_0$, then $(A_0 - C \cdot z)L(z)$ is approximately equal to $L_0A_0$. The ray will leak out of the wedge layer 12 when $L = \cos \theta_c$ where $\theta_c$ is the critical angle = $[1 - (n_2/n_1)^2]^{\frac{1}{2}}$. Thus, the condition for leaving the wedge layer 12 is $A_0 - C \cdot z = L_0A_0/\cos \theta_c$. This will occur at $z = (A_0/C)(1 - L_0/\cos \theta_c)$. Consequently, the density of rays emerging in z is proportional to the density of rays in the initial direction cosine $L_0$. For example, the density will be uniform if the initial distribution in $L_0$ is uniform.

In a second example, the index profile is no longer uniform but falls off both in x and in z. If the fall-off in z is much slower than in x, the light ray path is still almost periodic, and the above adiabatic invariance still applies. Then, as the light ray 24 propagates in z, the path in x,nL space is almost periodic. Therefore the maximum value of L(z) increases and at some z may reach the critical value for escape. The z value for escape depends on the details of the index (n) profile. When this is specified, the analysis proceeds as in example 1 above. Thus, for a parabolic index profile, the index profile has the form $n^2(x) = n^2_0[1 - 2\Delta(x/\rho)^2]$ for $-\rho < x\rho$, $= n_1^2 = n_0^2[1-2\Delta]$ for $|x| > \rho$. Then, the critical angle at $x=0$ is still given by $\sin^2 \theta_c = 2\Delta = 1 - (n_1/n_0)^2$. Then, if we have $n_0$ a slowly decreasing function of z, the slope $\theta$ at $x=0$ will slowly increase by the adiabatic invariance of $\int nLdx$, while $\theta_c$ decreases so that light rays will escape. The details of the light ray distributions will depend on how the index (n) varies with z.

Nonwedge Tapered Geometries

In the most general case the light can be input into any shape layer (e.g., parallelepiped, cylinder or nonuniform wedge), but the index of refraction can be varied as desired in (x,y,z) to achieve the appropriate end result when coupled to means to output light to ambient.

Figure 5A:
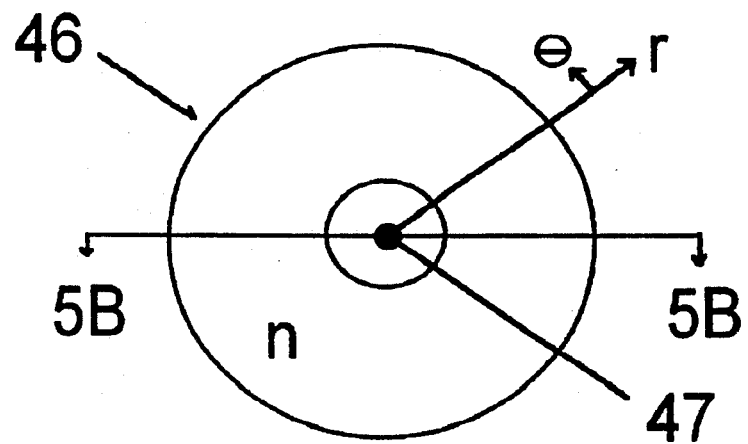
FIG. 5A shows a top view of a disc shaped light guide and FIG. 5B illustrates a cross section taken along 5B—5B in FIG. 5A.
Figure 5B:
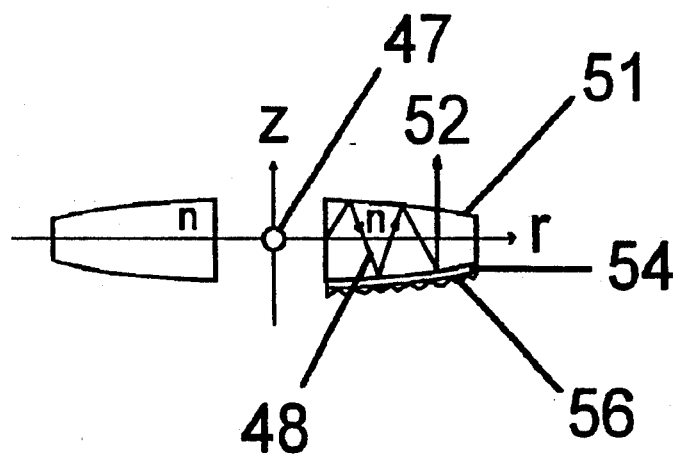

For example, consider a disc-shaped light guide 46 which is tapered in the radial direction r shown in FIG. 5. The direction cosines in cylindrical polar coordinates are $k_r$, $k_\theta$, $k_z$. Light 48 propagating in this guide 46 satisfies the relationship:

$\int nk_z dz \sim$ constant. (adiabatic invariance)
$nrk_\theta =$ constant. (angular momentum conservation)

The adiabatic invariance condition is identical with that for the wedge device 16, and the previous discussions pertinent to the wedge device 10 also apply to the guide 46. The angular momentum conservation condition requires that as the light streams outward from source 47 with increasing radius, the k$\theta$ value decreases. Therefore, the light becomes collimated in the increasing radial direction. This makes the properties similar to the wedge device 10, and the light 48 can be made to emerge as light 52 at a selected angle to face 51, collimated along the z direction.

For purposes of illustration we take the guide material to have a constant index of refraction n. For such geometries the light rays 48 along the two-dimensional cross sectional plane taken along 5B—5B behave just as in the case of its wedge counterpart described hereinbefore. Similarly, various additional layers 54 and 56 and other means can be used to achieve the desired light handling features. For example, for the disc light guide 46 a preferred facet array 56 is circles, concentric with the disk 46. Thus, if the facets 56 are linear in cross section, the light rays 52 will emerge in a direction collimated within a full angle of 2$\phi$ times a function of the indices of refraction as in the device 10 described hereinbefore.

Manufacture of the device 10 can be accomplished by careful use of selected adhesives and lamination procedures. For example, the wedge layer 12 having index $n_1$ can be adhesively bonded to the first layer 28 having index $n_2$. An adhesive layer 60 (see FIG. 3B) can be applied in liquid form to the top surface of the first layer 28 and the layer 28 is adhesively coupled to the bottom surface 16 of the wedge layer 12. In general, the order of coupling the various layers can be in any given order.

In applying the layer 12 to the layer 28 and other such layers, the process of manufacture preferably accommodates the formation of internal layer interfaces which are substantially smooth interfacial surfaces. If not properly prepared such internal layers can detrimentally affect performance because each interface between layers of different indices can act as a reflecting surface with its own characteristic critical angle. If the interfacial surfaces are substantially smooth, then the detrimental effect of uneven surfaces is negligible. Therefore in effectuating the lamination of the various layers of the device 10, the methodology should utilize adhesives and/or joining techniques which provide the above described smooth interfacial layers. Examples of lamination processes include without limitation joining without additional adhesive layers, coatings applied to one layer and then joined to a second layer with an adhesive and applying a film layer with two adhesive layers (one on each layer surface to be joined to the other).

The most preferred embodiment is lamination of layers without any additional internal layer whose potential interfacial roughness will distort the light distribution. An example of such a geometry for the device 10 can be a liquid layer between the wedge layer 12 and the second layer 30. This method works best if the first layer 29 (such as the liquid layer) acts as an adhesive. One can choose to cure the adhesive either before, partially or completely, or after joining together the various layers of the device 10. The optical interface is thus defined by the bottom surface of the wedge layer 12 and the top surface of the second layer 30.

In another embodiment wherein a coating is used with an adhesive layer, the first layer 28 can be the coating applied to the second layer 30. Then, the coated film can be laminated to the wedge layer 12 in a second step by applying an adhesive between the coated film and the wedge layer 12. It is preferable to apply the low index coating to the second layer 30 rather than directly to the wedge layer 12 since the second layer 30 is typically supplied in the form of continuous film rolls. In practice it is more cost effective to coat such continuous rolls than to coat discrete pieces. With this methodology it is more convenient to control thickness of the applied low index layer.

In a further embodiment using a film and two adhesives, the first layer 28 can be an extruded or cast film which is then laminated to the wedge layer 12, or between the wedge layer 12 and the second layer 30 using adhesive between the two types of interfaces. In order to minimize the detrimental light scattering described hereinbefore, the adhesive layer should be flat and smooth. The film can be obtained as a low index material in commercially available, inexpensive forms. Such additional adhesive layers can increase the strength by virtue of the multi-layer construction having adhesive between each of the layers.

In the use of adhesive generally, the performance of the device 10 is optimized when the index of the adhesive between the wedge layer and the first layer is as close as possible to the index of the first layer 28. When the critical angle at the wedge/adhesive interface is as low as possible, then the light undergoes a minimal number of reflections off the lower quality film interface before exiting the device 10. In addition, the index change at the surface of the first layer film is minimized which decreases the effects of film surface roughness.

Further, methods of manufacture can include vapor deposition, sputtering or ion beam deposition of the first layer 28 since this layer can be quite thin as described hereinbefore. Likewise, the second layer 30 can be controllably applied to form the faceted layer 30 shown in FIG. 2B (such as by masking and layer deposition).

While preferred embodiments of the invention have been shown and described, it will be clear to those skilled in the art that various changes and modifications can be made without departing from the invention in its broader aspects as set forth in the claims provided hereinafter.

What is claimed is:

1. An optical device for collecting light and for selectively outputting light, comprising:

a wedge shaped cross sectional layer for receiving light and having an optical index of refraction $n_1$ and a top and bottom wedge surface converging to define at least one angle of inclination $\phi$, said wedge layer further including a back surface spanning said top and bottom surfaces and an end surface disposed opposite said back surface with said back surface having a larger thickness than said end surface and with light capable of being input through said back surface;

a first layer having an optical index of refraction $n_2$ and coupled to said bottom surface of said wedge layer, said first layer and said wedge layer forming an effective optical interface with a higher critical angle $\theta_c$ than the critical angle $\theta_a$ at an interface between said wedge layer and ambient and said effective optical layer interface comprising means for angularly filtering said input light when said light within the wedge layer achieves an angle to said bottom wedge surface less than said $\theta_c$ and $\theta_c - \theta_a$ exceeding said angle $\phi$ and causing the light to preferentially enter into said first layer before the light in said wedge layer is able to pass into ambient; and means for causing output of the light into ambient from said device.

2. The optical device as defined in claim 1 wherein said $n_1 > n_2 > 1$.

3. The optical device as defined in claim 1 wherein said wedge layer or said means for causing light output is coupled to said first layer by an additional layer of different index of refraction than said first layer and said wedge layer.

4. The optical device as defined in claim 1 wherein said means for causing light output comprises an additional layer coupled to said first layer.

5. The optical device as defined is claim 4 wherein said additional layer comprises at least one of a reflective layer, a paint layer and a translucent layer.

6. The optical device as defined in claim 4 wherein said additional layer comprises at least one of a roughened layer portion of said bottom layer, a changed geometry layer, a thin paint layer or a thin adherent layer.

7. The optical device as defined in claim 6 wherein said changed geometry layer comprises at least one of curved facets, flat facets and facets of irregular shape.

8. An optical device for collection and output of light, comprising:

a layer having a wedge shape cross section for receiving input light and having an optical index $n_1$ and a top and bottom wedge surface converging to define at least one angle of inclination $\phi$, said wedge layer further including a back surface spanning said top and bottom surfaces with said back surface operable as a light input aperture;

a first layer coupled to said bottom wedge surface having an optical index of refraction $n_2$ such that an effective optical dielectric interface between said wedge layer and said first layer has a higher critical angle $\theta_c$ than a critical angle $\theta_a$ at an ambient interface with said wedge layer;

a second layer having an optical index of refraction $n_3$ and allowing the light to enter said second layer; and means for causing output from said optical device into ambient by passage of the light at least across said second layer and said means for causing output also for redirecting the light to product a collimated light of controlled angular output into ambient from said optical device.

9. The optical device as defined in claim 8 wherein said means for causing output generates said collimated light having an approximate angular width $\Delta\theta$ ranging from a maximum $\Delta\theta$ less than the angular width of said input light to a minimum $\Delta\theta$ substantially in accordance with the expression $\Delta\theta = 2\phi(n_1^2 - n_2^2)^{\frac{1}{2}}/[1-(n_2/n_3)^2]^{\frac{1}{2}}$.

10. The optical device as defined in claim 8 wherein at least one of (a) said first layer is coupled to said second layer and (b) said first layer is coupled to said bottom wedge surface by an intervening layer of index of refraction different from said adjacent layers.

11. An optical device for collection and output of light, comprising:

a layer having a wedge shaped cross section for receiving input light and having an optical index $n_1$, and a top and bottom wedge surface converging to define at least one angle of inclination $\phi$, said wedge layer further including a back surface spanning said top and bottom surfaces with said back surface operable as a light input aperture;

a first layer having an optical index of refraction $n_2$ and coupled to said wedge bottom surface such that an effective dielectric interface between said wedge layer and said first layer has a high critical angle $\theta_c$ than a critical angle $\theta_a$ at an air interface with said wedge layer thereby allowing the light to enter said first layer before entering ambient;

a second layer having an optical index of refraction $n_3$ and allowing the light to leave said first layer and enter said second layer; and means for causing output of the light from said second layer into ambient by passage through at least one of said second layer and said top surface of said wedge layer.

12. The optical device as defined in claim 11 wherein $n_3 > n_1 > n_2$.

13. The optical device as defined in claim 11 wherein said second layer comprises at least one of a changed geometry portion, a coating and a scattering layer.

14. The optical device as defined in claim 11 wherein said means for causing output comprises at least one of (a) a faceted surface coupled to said second layer and (b) means for reflecting light.

15. The optical device as defined in claim 11 wherein said second layer comprises a faceted material for at least one of optically reflective redirection and transmission of the light.

16. The optical device as defined in claim 15 wherein said faceted second layer comprises facets at the interface with said first layer.

17. The optical device as defined in claim 15 wherein said facets are selectively curved to modify the angular output from said facets.

18. The optical device as defined in claim 17 wherein said curved facets comprise at least one of a parabolically curved surface, an elliptically curved surface, a circularly curved surface and combinations thereof.

19. The optical device as defined in claim 18 further including linear shaped facets in combination with said curved facets.

20. The optical device as defined in claim 11 wherein at least one of (a) said first layer is coupled to said second layer, (b) said first layer is coupled to said wedge bottom surface by an intervening layer of index of refraction different from adjacent layers and (c) said second layer is coupled to said means for causing light output.

21. The optical device as defined in claim 11 wherein said second layer comprises at least one of a volume diffuser, a surface diffuser, a picture to be displayed, and a hologram.

22. The optical device as defined in claim 20 wherein said intervening layer comprises an adhesive layer.

23. An optical device for selectively redirecting light, comprising:
   a wedge shaped cross sectional layer for receiving light light and having an optical index of refraction $n_1$, and a top and bottom wedge surface converging to define at least one angle of inclination $\phi$, said wedge layer further including a back surface spanning said top and bottom surface;
   a first layer having an optical index of refraction $n_2$ different from $n_1$ and coupled to said bottom surface of said wedge layer with said difference between $n_2$ and $n_1$ forming an effective optical interface with a high critical angle $\theta_c$ than the critical angle $\theta_a$ at an interface between said wedge layer and ambient causing light to preferentially enter said first layer before the light is able to pass into ambient; and
   a second layer allowing passage across said second layer of light output from said first layer and further enabling output of light into ambient from said optical device.

24. The optical device as defined in claim 23 wherein said optical device is operable as a concentrator with the light being input into said wedge layer, passed through at least said first layer and capable of output from said back surface of said wedge layer.

25. An optical device for collecting light from a source and for selectively outputting light from said device, comprising:
   a layer having a wedge shaped cross section for receiving light from said source and having an optical index of refraction $n_1$, and a top and a bottom wedge surface converging to define at least one angle of inclination $\phi$, said wedge layer further including a back surface spanning said top and bottom wedge surfaces;
   layer means coupled to said bottom surface of said wedge layer and having an optical index of refraction $n_2$ and light thereby entering into said layer means when the light in said wedge layer achieves a critical angle of incidence $\theta_c$ characteristic of an optical interface between said wedge layer and said layer means; and
   light redirecting means coupled to said layer means for outputting light from said device and controlling the angular range of the light being output from said optical device.

26. An optical device for collection and output of light, comprising:
   a layer having a wedge shaped cross section for receiving input light and having an optical index $n_1$, and a top and bottom wedge surface converging to define at least one angle of inclination $\phi$, said wedge layer further including a back surface spanning said top and bottom surfaces;
   means coupled to said bottom wedge surface having an optical index of refraction $n_2$ for receiving light from adjacent layers of said device;
   a second layer having an optical index of refraction $n_3$ and allowing the light to leave said means coupled to said bottom wedge surface and enter said second layer; and
   means for redirecting light and causing output of the light over a controlled angular range from said optical device into ambient.

27. The optical device as defined in claim 26 wherein one of (a) said means for redirecting light, (b) said second layer and (c) said means coupled to said bottom wedge surface, includes a faceted surface.

28. The optical device as defined in claim 27 wherein said facets comprises a geometry such that diffraction effects by the light are avoided.

29. The optical device as defined in claim 28 wherein the minimum size of said facets is about 30 to 50 times the shortest light wavelength being used.

30. The optical device as defined in claim 28 wherein the maximum facet size is about $10^{-4}$ of the minimum user viewing distance.

31. The optical device as defined in claim 28 wherein the maximum facet size when said device includes an intervening light diffuser is at least about the distance between said diffuser and said facet times the sine of the range of angular distribution of light output.

32. The optical device as defined in claim 28 wherein said facets are disposed substantially perpendicular to the light path.

33. An optical device for collecting and selectively outputting light, comprising:
   a wedge shaped layer having a variable index of refraction $n(x,y,z)$ and a top and bottom surface converging to define at least one angle of inclination $\phi$ said wedge shaped layer further including side surfaces and a back surface spanning said top, bottom and side surfaces;
   a first layer having an optical index of refraction $n_2$ and coupled to said bottom surface of said wedge shaped layer and causing light input through said back surface of said wedge shaped layer to preferentially be output into said first layer when said variable index causes the light to achieve a critical angle of incidence $\theta_c$ with respect to a reference plane at $x=0$; and
   means for selectively causing output of the light from said first layer into ambient.

34. The optical device as defined in claim 33 wherein the light is output at distance D perpendicular to said back surface where D is determined by achievement of said $\theta_c$.

35. The optical device as defined in claim 33 wherein said wedge shaped layer comprises a non-linear taper defining a plurality of said angles $\theta$.

36. The optical device as defined in claim 33 wherein said $\theta_c$ is determined by $n^2(x,z)=n^2(x)$ and $\sin \theta_c = [1-(n_1/n(0,z))^2]^{\frac{1}{2}}$.

37. The optical device as defined in claim 33 wherein said device concentrates light received from a source.

38. An optical device for collecting light and for selectively outputting light, comprising:
   a base layer for receiving input light and having an optical index of refraction $n_1$, and including a back surface and also a top and bottom surface converging to define at least one angle of inclination, the light capable of being input into said back surface which is the thicker end of said converging base layer;

a first layer having an optical index of refraction $n_2$ and coupled to said bottom surface of said base layer causing light input through said back surface of said base layer to preferentially enter into said first layer; and means for selectively causing the light to be output into ambient from said optical device.

39. The optical device as defined in claim 38 for collecting light and selectively outputting light prepared by the steps of:

(a) preparing a base layer having an optical index of refraction n, a back surface and a top and bottom surface intersecting to define at least one angle of inclination;

(b) adhesively coupling a first layer to said base layer, said first layer having an optical index of refraction $n_2$ and coupled adhesively to said bottom layer of said base layer, said adhesive layer having no substantial optical effect on said device such that light input through said back surface is preferentially output into said first layer; and (c) coupling said first layer to means for selectively causing output of the light from said first layer into ambient.

40. An optical device for collecting light from a source and for selectively outputting light from said device, comprising:

a wedge shaped cross sectional layer for receiving light from said source and having an optical index of refraction $n_1$ and a top and a bottom wedge surface converging to define at least one angle of inclination, $\phi$, said wedge layer including a back surface spanning said top and bottom surfaces;

light transmission means coupled to said bottom surface of said wedge layer and having an optical index of refraction $n_2$ for allowing the light from said wedge layer to enter into said light transmission means; and light redirecting layer means coupled to said light transmission means and allowing passage of the light at least across the thickness of said light redirecting layer means and for redirecting the light to provide controlled angular output of the light from said optical device.

41. An optical device for collecting light, including light form an uncollimated light source and for selectively outputting light from said device, comprising:

a layer having a wedge shaped cross section for receiving the light from said light source and having a back surface capable of receiving input light and an optical index of refraction $n_1$, and further including converging top and bottom wedge surfaces defining said back surface comprising a larger wedge thickness end of said wedge layer;

light transmission means coupled to said wedge layer and having an optical index of refraction $n_2$ for establishing a critical angle of incidence $\theta_c$ characteristic of an optical interface between said wedge layer and said light transmission means, the light thereby preferentially able to enter into said light transmission means when the light achieves the critical angle $\theta_c$; and light redirecting means coupled to said light transmission means for outputting light passed through said light transmission means and for allowing passage of the light across at least said light redirecting means for outputting light of controlled angular range from said optical device.

42. An optical device for collecting light, including light from an uncollimated source of light and selectively outputting the light from said device, comprising:

a layer having a wedge shaped cross section for receiving light from said source and having an optical index of refraction $n_1$, said wedge layer having converging top and bottom wedge surfaces spanning a back wedge surface forming a larger wedge thickness end of said wedge layer and said back wedge surface capable of receiving said input uncollimated light;

layer means having a lower index of refraction than said wedge layer and coupled to said wedge layer creating a critical angle of incidence for the light in said wedge layer characteristic of an optical interface between said bottom wedge surface and said layer means, thereby causing light to enter into said layer means upon the light achieving the critical angle; and light redirecting means for redirecting light output from said wedge layer through at least said layer means, said light redirecting means cooperating with said wedge layer and said layer means to provide light of controlled angular output from said optical device into ambient.

43. An optical device for collecting light, including uncollimated light from a source and selectively outputting the light from said device, comprising:

a layer having a wedge shaped cross section for receiving light from said source and having an optical index of refraction $n_1$, said layer having a top surface and a back surface and further including a bottom surface coupled to a first layer with an optical index of refraction $n_2$ less than $n_1$ and light input to said wedge layer entering into said first layer when the light in said wedge layer achieves a critical angle of incidence $\theta_c$ characteristic of an optical interface between said bottom surface and said first layer; and light redirecting means having an index of refraction $n_3$ for selectively redirecting light passed through at least said first layer and outputting the light from said optical device, said light redirecting means further comprising angular control means for focusing light.

44. A luminaire device, comprising:

a member having a wedge-shaped cross section for receiving light from a source and being substantially optically transparent and having a pair of nonparallel faces and an index of refraction $n_1$;

a first layer optically coupled to one of said nonparallel faces of said wedge-shaped member, said first layer having an index of refraction $n_2$ lower than said wedge-shaped member; and a second layer having an index of refraction $n_3$ greater than said first layer and including means for optically redirecting light received by passage through at least said first layer and also for angular control of light output from said device.

45. The luminaire device as defined in claim 44 wherein at least one of (a) said first layer is coupled to said second layer and (b) said first layer is coupled to said wedge-shaped member by an intervening layer of index of refraction different from adjacent layers.

46. A luminaire device, comprising:

an optically transparent member of index of refraction $n_1$ for receiving light from a source and having a pair of converging surfaces;

means for introducing uncollimated light between said converging surfaces of said optically transparent member;

as first layer of substantially uniform thickness optically coupled with one of said converging surface, said first layer having an index of refraction $n_2$ less than the index of refraction $n_1$ of said optically transparent member and preferentially causing entry of the light into said first layer; and a second layer overlying said first layer and including means for redirecting light incident thereon to control the angular output range of the light output from said luminaire device.

47. The luminaire device as defined in claim 46 wherein said means for redirecting light includes at least of a faceted layer, a roughened layer, a diffusely reflecting layer and a translucent layer.

48. The luminaire device as defined in claim 46 wherein at least one of (a) said first layer is coupled to said second layer and (b) said first layer is coupled to said optically transparent member by an intervening layer of index of refraction different from adjacent layers.

* * * * *

UNITED STATES PATENT AND TRADEMARK OFFICE
CERTIFICATE OF CORRECTION

PATENT NO. : 5,237,641    Page 1 of 3

DATED : August 17, 1993

INVENTOR(S) : Jacobson et al.

It is certified that error appears in the above-identified patent and that said Letters Patent is hereby corrected as shown below:

| | |
|---|---|
| Column 1, Line 27, | cancel "on" and insert -- an --; |
| Column 2, Line 9, | cancel "illumi7" and insert -- illumi- --; |
| Column 2, Line 51, | cancel "cc" after "In"; |
| Column 4, Line 43, | cancel "uni7" and insert -- uni- --; |
| Column 5, Line 61, | after "axis" cancel the comma (,) and insert a period (.); |
| Column 5, Line 65, | insert a space before the word "in"; |
| Column 6, Line 14, | insert a space before the word "which"; |
| Column 6, Line 21, | cancel "$L_2$" and insert -- $L^2$ --; |
| Column 6, Line 22, | after "$\theta_{2eff}$/sin" cancel the return; |

UNITED STATES PATENT AND TRADEMARK OFFICE
CERTIFICATE OF CORRECTION

PATENT NO. : 5,237,641

DATED : August 17, 1993

INVENTOR(S) : Jacobson et al.

It is certified that error appears in the above-identified patent and that said Letters Patent is hereby corrected as shown below:

Column 6, Line 22, after "$[1-M_1^2]$", in the first occurrence, cancel "/" before "½";

Column 7, Line 27, cancel "condi7" and insert -- condi- --;

Column 7, Line 29, cancel "k8" and insert -- $k_\theta$ --;

Column 7, Line 66, cancel "detri7" and insert -- detri- --;

Column 8, Line 3, cancel "lami7" and insert -- lami- --;

Column 8, Line 29, cancel "typi7" and insert -- typi- --;

Column 11, Line 15, cancel "light" in the first occurrence, and insert -- input --;

Column 12, Line 16, cancel "comprises" and insert -- comprise --;

UNITED STATES PATENT AND TRADEMARK OFFICE
CERTIFICATE OF CORRECTION

PATENT NO. : 5,237,641
DATED : August 17, 1993
INVENTOR(S) : Jacobson et al.

It is certified that error appears in the above-identified patent and that said Letters Patent is hereby corrected as shown below:

Column 13, Line 43,   cancel "redi7" and insert -- redi- --;

Column 13, Line 49,   cancel "form" and insert -- from --;

Column 15, Line 7,    cancel "as" and insert -- a --;

Column 15, Line 7,    cancel "opti7" and insert -- opti- --;

Column 15, Line 8,    cancel "surface" and insert -- surfaces --;

Column 11, Line 25,   cancel "high" and insert -- higher --;

Column 16, Line 4,    after "least" insert "one".

Signed and Sealed this

Twenty-ninth Day of March, 1994

Attest:

BRUCE LEHMAN

Attesting Officer

Commissioner of Patents and Trademarks